United States Patent
Lei et al.

(10) Patent No.: US 8,515,750 B1
(45) Date of Patent: Aug. 20, 2013

(54) REALTIME ACOUSTIC ADAPTATION USING STABILITY MEASURES

(71) Applicant: Google Inc., Mountain View, CA (US)

(72) Inventors: Xin Lei, Sunnyvale, CA (US); Petar Aleksic, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/622,576

(22) Filed: Sep. 19, 2012

Related U.S. Application Data (60) Provisional application No. 61/655,855, filed on Jun. 5, 2012.

(51) Int. Cl.
*G10L 15/26* (2006.01)

(52) U.S. Cl.
USPC ........ 704/235; 704/270.1; 704/244; 704/254; 704/245; 379/88.01; 379/88.02

(58) Field of Classification Search
USPC .............. 704/270.1, 251, 235, 243, 244, 260, 704/270, 211, 231, 254, 245, 246, 233, 236; 379/88.02, 88.01; 709/231, 224
See application file for complete search history.

(56) References Cited

U.S. PATENT DOCUMENTS

| | | | | |
|---|---|---|---|---|
| 5,199,077 A | * | 3/1993 | Wilcox et al. | 704/256 |
| 5,946,654 A | * | 8/1999 | Newman et al. | 704/246 |
| 6,260,013 B1 | | 7/2001 | Sejnoha | 704/240 |
| 6,330,536 B1 | * | 12/2001 | Parthasarathy et al. | 704/249 |
| 6,711,543 B2 | * | 3/2004 | Cameron | 704/270 |
| 7,216,077 B1 | * | 5/2007 | Padmanabhan et al. | 704/240 |
| 7,668,718 B2 | * | 2/2010 | Kahn et al. | 704/270 |
| 7,729,912 B1 | * | 6/2010 | Bacchiani et al. | 704/252 |
| 8,032,372 B1 | * | 10/2011 | Zimmerman et al. | 704/235 |
| 2003/0033152 A1 | * | 2/2003 | Cameron | 704/275 |
| 2003/0154080 A1 | * | 8/2003 | Godsey et al. | 704/251 |
| 2006/0064177 A1 | * | 3/2006 | Tian et al. | 700/1 |
| 2006/0149558 A1 | * | 7/2006 | Kahn et al. | 704/278 |
| 2008/0004876 A1 | | 1/2008 | He et al. | |
| 2009/0319265 A1 | * | 12/2009 | Wittenstein et al. | 704/234 |
| 2012/0253811 A1 | * | 10/2012 | Breslin et al. | 704/249 |

OTHER PUBLICATIONS

Baumann, Timo et al., "Assessing and Improving the Performance of Speech Recognition for Incremental Systems," Human Language Technologies: The 2009 Annual Conference of the North American Chapter of the ACL, pp. 380-388, Boulder, Colorado, Jun. 2009. © 2009 Association for Computational Linguistics.

McGraw, Ian et al., "Estimating Word-Stability During Incremental Speech Recognition," Sep. 2011, 4 pages.

* cited by examiner

*Primary Examiner* — Vijay B Chawan
(74) *Attorney, Agent, or Firm* — Fish & Richardson P.C.

(57) ABSTRACT

Methods, systems, and computer programs encoded on a computer storage medium for real-time acoustic adaptation using stability measures are disclosed. The methods include the actions of receiving a transcription of a first portion of a speech session, wherein the transcription of the first portion of the speech session is generated using a speaker adaptation profile. The actions further include receiving a stability measure for a segment of the transcription and determining that the stability measure for the segment satisfies a threshold. Additionally, the actions include triggering an update of the speaker adaptation profile using the segment, or using a portion of speech data that corresponds to the segment. And the actions include receiving a transcription of a second portion of the speech session, wherein the transcription of the second portion of the speech session is generated using the updated speaker adaptation profile.

20 Claims, 3 Drawing Sheets

REALTIME ACOUSTIC ADAPTATION USING STABILITY MEASURES

CROSS-REFERENCE TO RELATED APPLICATION

This application claims the benefit of U.S. Provisional Application Ser. No. 61/655,855, filed Jun. 5, 2012, the entirety of which is hereby incorporated by references as if fully set forth therein.

TECHNICAL FIELD

This specification generally relates to continuous speech recognition.

BACKGROUND

An automated speech recognizer (ASR) may use a speaker-dependent adaptation profile to increase speech recognition performance. A profile may be periodically updated, for example at the end of a user's speech session.

SUMMARY

In some implementations, instead of or in addition to performing profile adaptation at the end of a speech session, profile adaptation may be performed within a speech session when useful adaptation data is available. In doing so, the ASR may adapt more quickly to current conditions and may improve recognition performance as the speech session progresses. According to an innovative aspect of the present disclosure, profile adaptation may be triggered during a speech session when a segment of recognition data becomes stable.

In general, one aspect of the subject matter described in this specification may be embodied in methods that include the actions of receiving a transcription of a first portion of a speech session, wherein the transcription of the first portion of the speech session is generated using a speaker adaptation profile. The actions further include receiving a stability measure for a segment of the transcription and determining that the stability measure for the segment satisfies a threshold. Additionally, the actions include triggering an update of the speaker adaptation profile using the segment, or using a portion of speech data that corresponds to the segment. And the actions include receiving a transcription of a second portion of the speech session, wherein the transcription of the second portion of the speech session is generated using the updated speaker adaptation profile.

Another aspect of the subject matter may be embodied in methods that include the actions of receiving a first portion of a speech session and decoding the first portion of the speech session to generate a transcription of the first portion of the speech session using a speaker adaptation profile. Further actions include identifying a segment of the transcription of the first portion of the speech session and then determining a stability measure of the segment. Additionally, the actions include determining that the stability measure for the segment satisfies a threshold. The actions also include triggering an update of the speaker adaptation profile using the segment, or using a portion of speech data that corresponds to the segment. Then the actions include receiving a second portion of the speech session, and decoding the second portion of the speech session to generate the transcription of the second portion of the speech session using the updated speaker adaptation profile.

Other embodiments of these aspects include corresponding systems, apparatus, and computer programs, configured to perform the actions of the methods, encoded on computer storage devices.

These and other embodiments may each optionally include one or more of the following features. For instance, in some implementations, a segment comprises a word, sub-word, or group of words. And in some cases, the speech session is longer than 1 minute in duration. And in some embodiments, the speech session comprises one utterance, whereas in other embodiments the speech session comprises multiple utterances.

In certain embodiments, the stability measure is based on one or more of an age metric, a right context metric, and a regression. In certain embodiments, the stability measure represents a probability.

In some embodiments, triggering an update of the speaker adaptation profile comprises adding the segment to an adaptation queue.

Some embodiments include the further steps of receiving the first portion of the speech session, and decoding the first portion of the speech session to generate the transcription of the first portion of the speech session using the speaker adaptation profile. In some aspects, the actions further include determining the stability measure of the segment.

In certain embodiments, the method further includes receiving the second portion of the speech session, and decoding the second portion of the speech session to generate the transcription of the second portion of the speech session using the updated speaker adaptation profile. Certain embodiments further include the action of updating the speaker adaptation profile. In some embodiments, updating the speaker adaptation profile includes modifying an acoustic model.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
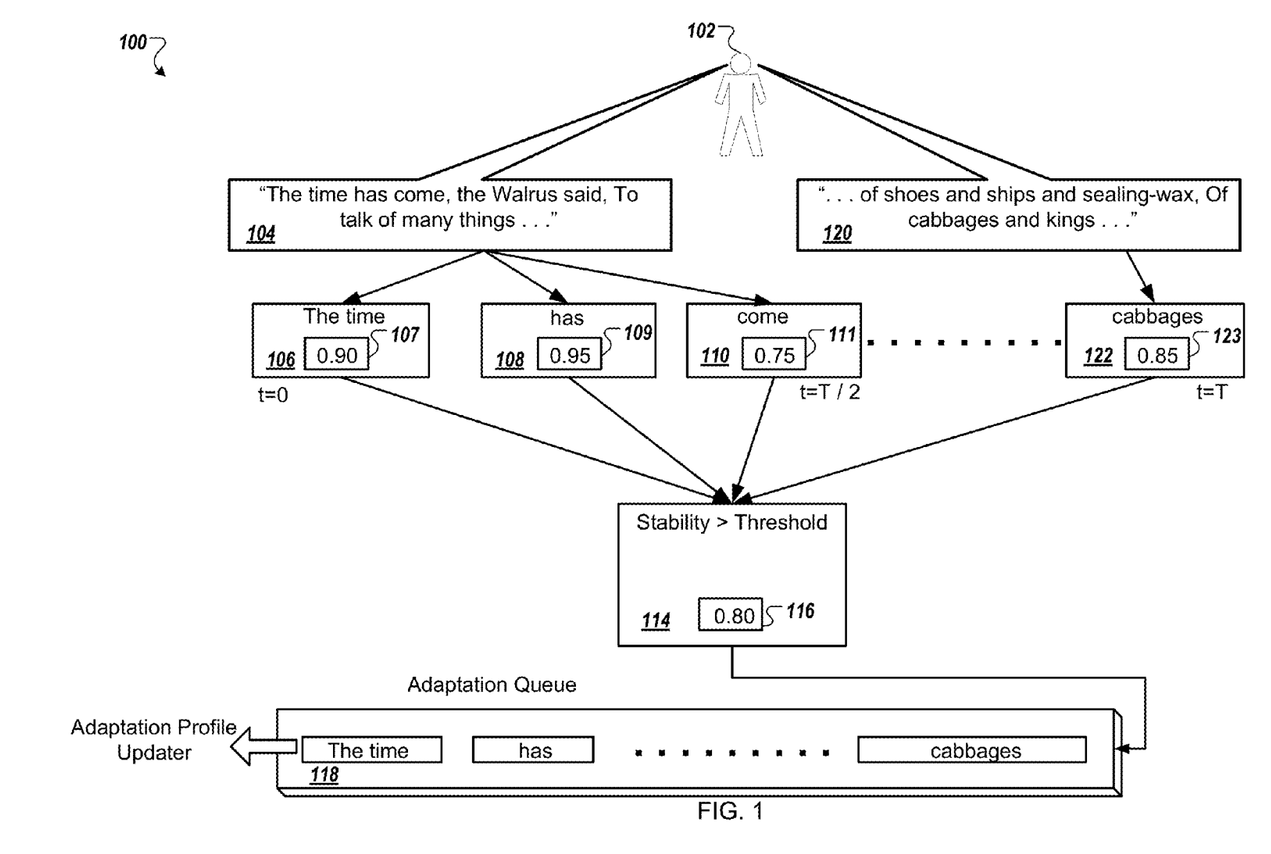
FIG. 1 illustrates an example process for triggering an update to a speaker adaptation profile when the stability measures associated with segments of speech data encoding a speech session satisfy a threshold.

FIG. 1 illustrates an example process 100 for triggering an update to a speaker adaptation profile when the stability measures associated with segments of speech data encoding a speech session satisfy a threshold. As referred to in the present disclosure, a speech session is one or more utterances by a given speaker. In a speech session, short pauses separate words, and longer pauses separate phrases or sentences, which are referred to as utterances. In general, utterances may contain one or more words. The utterances in a speech session may be continuous, for example, a speech session could be dictation from a single speaker; or the utterances could be discontinuous, such as the collective utterances from one speaker among various speakers participating in an audio/video teleconference.

The process 100 can occur in real-time while a speech session is ongoing. The process 100 starts when an automated speech recognizer (ASR) outputs a transcription 104 of part of the speech session of a user 102. In this example, the transcription 104 of the user's first utterance is: "The time has come, the Walrus said, to talk of many things." The ASR uses an initial speaker adaptation profile to generate the transcription 104.

The ASR then divides the transcription 104 into speech segments and determines a stability measure for each speech segment. As noted below, the stability of a speech segment is specific to the time when it is determined, and the stability of a given speech segment may increase over time. From the transcription 104, example speech segments 106, 108, and 110 evaluated before time t=T/2 are: "The time" with an associated stability measure 107 of 0.90; "has" with an associated stability measure 109 of 0.95; and "come" with an associated stability measure 111 of 0.75.

A segment stability evaluator 114 compares the stability measure for each speech segment 107, 109, and 111 with a threshold 116, which, in this example, has a value of 0.80. The speech segments that satisfy the threshold 116 are then input to an adaptation queue 118. For example, speech segments 106 and 108 have associated stability measures 107 and 109 that are greater than the sample threshold 116 value of 0.80. These speech segments 106 and 108 have been added to the adaptation queue 118. In contrast, by time t=T/2, speech segment 110 has an associated stability measure that is still less than the threshold 116 value of 0.80, and therefore was not added to the adaptation queue 118. An adaptation profile updater retrieves speech segments 106 and 108, or data corresponding to these segments, from the adaptation queue 118 to update the speaker adaptation profile.

Based on the stable speech segments 106 and 108, the updated speech adaptation profile can then be used to decode a later portion of the same speech session. Indeed, in some implementations the updated speech adaptation profile may be used to decode a later portion of the same utterance. This may allow the ASR to rapidly adapt to current conditions and provide a better user experience. For example, the ASR can use the updated speaker adaptation profile to provide a transcription 120 of the second part of the user's speech session. In this example, the transcription 120 of the user's second utterance is: "Of shoes and ships and sealing-wax, of cabbages and kings." As before, the ASR divides the transcription 120 into speech segments and determines a stability measure for each. Example speech segment 122 from the transcription 120 is "cabbages" with an associated stability measure 123 of 0.85. Advantageously, later portions of the speech session such as speech segment 122 may be recognized more accurately based on the updated speaker adaptation profile. The stability measure 123 of the speech segment 122 is then evaluated in the segment stability evaluator 114 and input to the adaptation queue 118.

The sample process 100 occurs over a time period shown as time t=0 to t=T. The transcriptions 104 and 120 are divided to form speech segments 106, 108, 110, and 122 between time t=0 and t=T. Each speech segment is then evaluated to determine a stability measure during the corresponding time frame. In the example, the sample stability measures 107, 109, 111 were determined between time t=0 and t=T/2, and sample stability measure 123 was determined between time t=T/2 and time t=T.

The stability measures associated with each speech segment may change over time. The stability measure 111 determined for speech segment 110, for example, is shown as 0.75 between t=0 and t=T/2, but this may change over time as additional speech segments are output. For example, at some time after t=T/2, the stability measure 111 may be re-evaluated and may then exceed the sample threshold of 0.80, at which time the speech segment 1110 can be input to the adaptation queue 118.

The process 100 can continue until the speech session is finished. Moreover, as long as the speech session continues, stable segments can be identified and used to update the speaker adaptation profile, which means that the accuracy of the speaker adaptation profile can continually be improved during the course of the speech session. This may particularly advantageous for longer speech sessions (e.g., greater than 1 minute) such as dictation or video conferencing applications.

Figure 2:
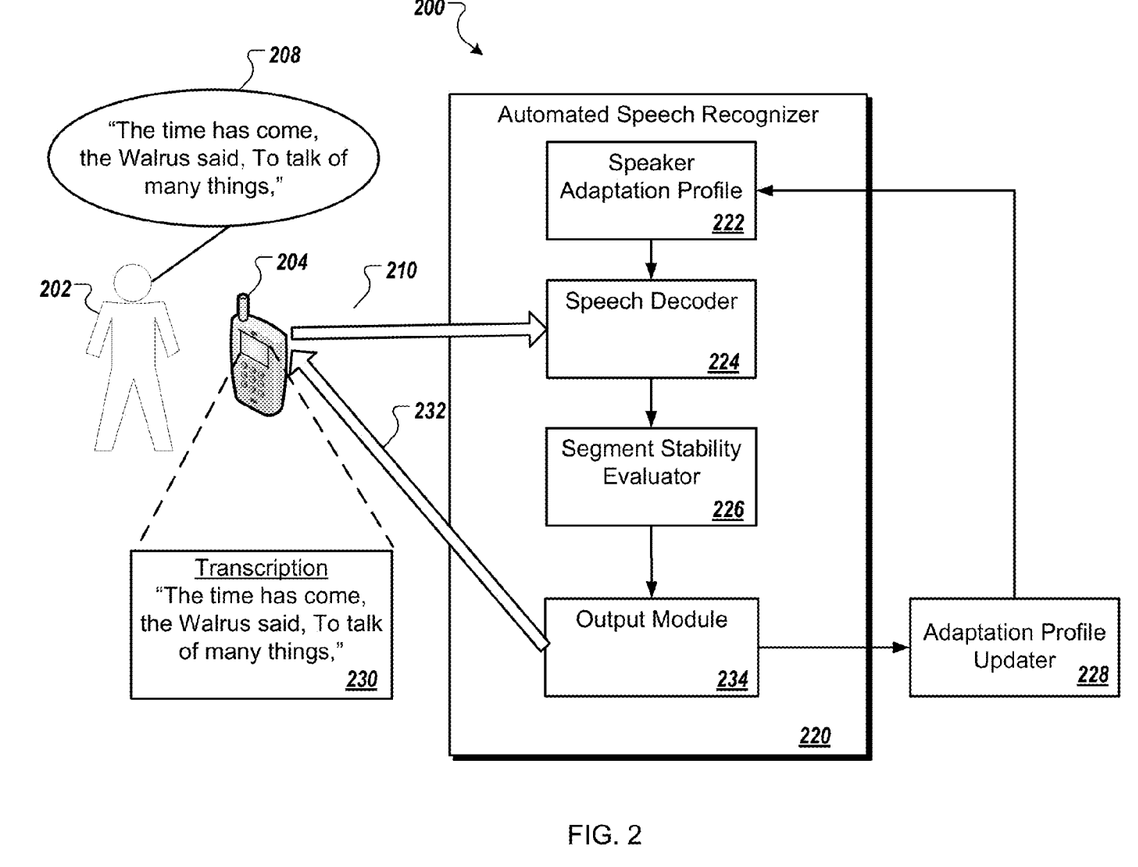
FIG. 2 is a diagram of an example system that can trigger updates of a speaker adaptation profile based on stability measures for segments of speech data.

Specific aspects of the process 100 shown in FIG. 1 will now be described with reference to the system 200 of FIG. 2. A user 202 speaks into a user device 204 that communicates with an ASR 220. The user device 204 may be any type of computing device, including but not limited to a mobile phone, smart phone, PDA, music player, e-book reader, tablet computer, laptop or desktop computer, or other stationary or portable device, that includes one or more processors and non-transitory computer readable media. In some versions, one or more components of the ASR 220 may be external to the user device 204, in which case communication between the ASR 220 and the user device 204 may occur over phone and/or computer networks including wireless cellular networks, wireless local area networks (WLAN) or Wi-Fi networks, wired Ethernet networks, other wired networks, or any combination thereof.

The user's speech session 208 is converted into a series of audio signals 210 that are communicated to the ASR 220. In particular, each portion of the speech session 208 may be encoded into an individual audio signal. For example, when the user 202 begins to utter a sentence (e.g., "The time has come, the Walrus said . . . "), the first portion of the speech session 208 is encoded and sent to the ASR 220 as a first audio signal 210. The speech session 208 can represent any type of voice communication, such as voice-based instructions, search engine query terms, dictation, dialogue systems, or any other input that uses transcribed speech or that invokes a software application using transcribed speech to perform an action. The speech session 208 can include one or multiple utterances.

The ASR 220 receives and processes the audio signal 210. For example, the ASR 220 may be configured to execute application code associated with a variety of software components, e.g., modules, objects, libraries, and services, for implementing a speaker adaptation profile 222, a speech decoder 224, a segment stability evaluator 226, and an output module 228.

As the ASR 220 receives the audio signal 210, the speech decoder 224 recognizes and transcribes the speech session 208. Periodically, the speech decoder 224 also divides the transcription into speech segments and determines stability measures for each of the segments. A speech segment may be, for example, a sub-word, a word, or a group of words. The segment stability evaluator 226 then compares the stability measures for each of the segments with a threshold to determine whether each segment is stable. Stable segments are then sent to an adaptation profile updater 228, which uses the segments to update the speaker adaptation profile 222.

Aspects of the ASR 220 will now be described in further detail. The speaker adaptation profile 222 as described herein is a set of models that are adapted to a particular speaker. The set of models may include, for example, acoustic models, language models, and vocabulary models that can be adapted to specific speech characteristics of the speaker. In certain embodiments, the speaker adaptation profile 222 can start as a set of generic recognition models that are then adapted to the speaker as described herein. In other versions, the speaker adaptation profile 222 can be initially trained using a set of known speech inputs so that it is pre-adapted to speech characteristics of the speaker, and it can then be improved as described herein. The speaker adaptation profile 222 can be any suitable data structure or object, and can be stored in any suitable computer readable media. For example, the speaker adaptation profile 222 may be a data table or tables, or a Java or C++ object stored in a memory that is accessible by the ASR 220. A speaker adaptation profile 222 is typically retrieved and loaded into memory by the ASR 220 for each recognized speaker so that it can be used by the speech decoder 224.

Once the speaker adaptation profile 222 has been loaded by the ASR 220, speech recognition is performed of the audio signal 210 by applying transforms based on the speaker adaptation profile 222 to the signal 210. The speech decoder 224 may be any suitable module configured to process an input audio signal 201 for speech recognition. In some versions, for example, the speech decoder 224 may be a computer program executing on the ASR 220. In other versions, the speech decoder 224 may be hardware, software, or firmware components that communicate with the ASR 220. For example, it may be a server that communicates with the ASR 220 via the Internet or via a wired (e.g., Ethernet) or wireless (e.g., Wi-Fi) connection.

In operation, the speech decoder 224 receives the audio signal 210 and recognizes and transcribes the speech session 208 as text. In some aspects, the speech decoder 224 stores the text as speech recognition hypotheses in a buffer as the audio signal 210 is received. As more of the audio signal 210 is received, these speech recognition hypotheses (also referred to as incremental speech recognition results) may be updated in the buffer over time to reflect the additional information. The speech decoder 224 can then use these hypotheses to identify speech segments, which may be sub-words, words, or groups of words from the hypotheses. The speech decoder 224 identifies speech segment boundaries based on predetermined parameters of the speech decoder 224 and characteristics of the speaker adaptation profile 222 as would be known to one of skill in the art.

The speech decoder 224 also determines stability measures associated with the segments. One or more stability characteristics can be combined, weighted, and/or normalized to produce a single stability measure for a segment, or several stability measures can be used for any given segment. For example, one stability characteristic may be based on how long a particular segment (e.g., word) has persisted as the most likely hypotheses. This may be referred to as an age or persistence metric. Another characteristic may be based on how close in time to the end of the most recent speech recognition hypothesis the segment resides. This can be referred to as a right-context of the segment. A further characteristic may be based on a regression used to estimate the probability that a given word is stable given a set of features associated with that word. For example, a logistic regression can be used to estimate the probability that a portion of an incremental result is stable. In some aspects, one or more of the stability measures can be used to determine segment boundaries and segment stability. It should also be noted that using one or more of these stability characteristics will cause the stability measure of any given segment to vary over time.

The stability measures can be any suitable value or set of values (e.g., integers or floating point numbers). In certain aspects, the stability measure can represent a probability or a confidence that the associated speech segment is stable, which can be derived from one or more of the stability characteristics described above. For example, sample stability measures 107, 109, 111, and 123 from FIG. 1 are shown as probabilities (i.e., having values of 0.0 to 1.0).

The speech segments and their associated stability measures can be stored by the speech decoder 224 in any suitable memory accessible by the segment stability evaluator 226. For example, they may be stored as Java or C++ objects in a heap, a stack, a queue, or a collection. While the segment stability evaluator 226 is illustrated in FIG. 2 as separate from the speech decoder 224, in some implementations it may be integrated with the speech decoder 224, for example, as a component, library, method, or function of the speech decoder 224.

The segment stability evaluator 226 receives the stability measures from the speech decoder 224 and compares them with a threshold. The threshold may be any suitable value or set of values (e.g., integers or floating point numbers) that is comparable with the stability measures. In certain aspects, the threshold can represent a minimum probability that a speech segment with a given stability measure is stable. The sample threshold 116 from FIG. 1, for example, is shown as a probability (i.e. 0.80). Non-limiting sample values for a threshold probability may be, for example, about 0.50, about 0.75, about 0.80, about 0.85, about 0.90, about 0.95, or about 0.99. The determination of the threshold is implementation specific, and may be, for example, determined empirically or statistically modeled. However, it should be noted that determination of a proper threshold involves a trade-off, i.e., higher thresholds will more accurately predict stability, but will cause less frequent updates of the speaker adaptation profile 222. Segments that satisfy the threshold (e.g., segments that have a stability measure greater than the threshold) are referred to as stable segments.

The segment stability evaluator 226 then triggers an update of the speaker adaptation profile 222 for each of the stable segments and/or speech data corresponding to those segments. Triggering the update may be done using any suitable technique, and may performed synchronously (i.e., as the stable segments are identified) or asynchronously (i.e. queued and processed as resources become available). For example, the segment stability evaluator 226 may push the stable segments and/or speech data corresponding to those segments to an adaptation queue associated with the speaker adaptation profile. The adaptation queue may be a first-in-first-out queue such as the sample adaptation queue 118 shown in FIG. 1, or may be any other suitable component such as a stack. When the adaptation profile updater 228 has processing resources available, it can retrieve the segments and/or speech data from the adaptation queue. In certain implementations, the update may be triggered using any suitable message queuing service such as Java messaging service or Microsoft message queuing. As another example, the segment stability evaluator 226 may make synchronous application programming interface (API) requests to the adaptation profile updater 228 including the stable speech segments and/or speech data as parameters.

The adaptation profile updater 228 may be any suitable module configured to receive the stable segments and update the speaker adaptation profile 222. In some versions, for example, the adaptation profile updater 228 may be a computer program executing on the ASR 220. In other versions, the adaptation profile updater 228 may be hardware, software, or firmware components that communicate with the ASR 220. For example, it may be a server that communicates with the ASR 220 via the Internet or via a wired (e.g., Ethernet) or wireless (e.g., Wi-Fi) connection.

In operation, the adaptation profile updater 228 uses the stable segments to update one or more of the models that form the speaker adaptation profile 222. In certain implementations, only the acoustic models of the speaker adaptation profile 222 are updated. For example, adaptation profile updater 228 can re-adapt the speaker's acoustic model using accumulated stable speech segments based on feature space adaptation, model space adaptation, or any other suitable technique. In other implementations, the language models and/or vocabulary models may be updated.

Once the adaptation profile updater 228 generates an updated speaker adaptation profile 222, it loads the updated profile into a suitable memory so that the profile is available for use by the speech decoder 224 to recognize additional speech. An advantage of this approach may be that the accuracy of the speaker adaptation profile can be continually improved and adapted to current acoustic conditions during a speech session. In some implementations, the accuracy of the speaker adaptation profile can even be improved and adapted during a single utterance.

The ASR 220 also sends speech segments to an output module 234 that can transmit signals 232 encoding these segments as transcriptions 230 to the user device 204, which can render representations of the transcriptions 230 for the user 202. While the speech segments are shown in FIG. 2 being transmitted from the segment stability evaluator 226 to the output module 228, in some implementations the speech segments may be sent directly from the speech decoder 224 to the output module 234. The transcriptions 230 can be sent to the user device 204 at particular time intervals, or in real-time as they are generated. In some implementations, both stable and unstable segments are sent, whereas in other implementations, only stable segments are sent.

Figure 3:
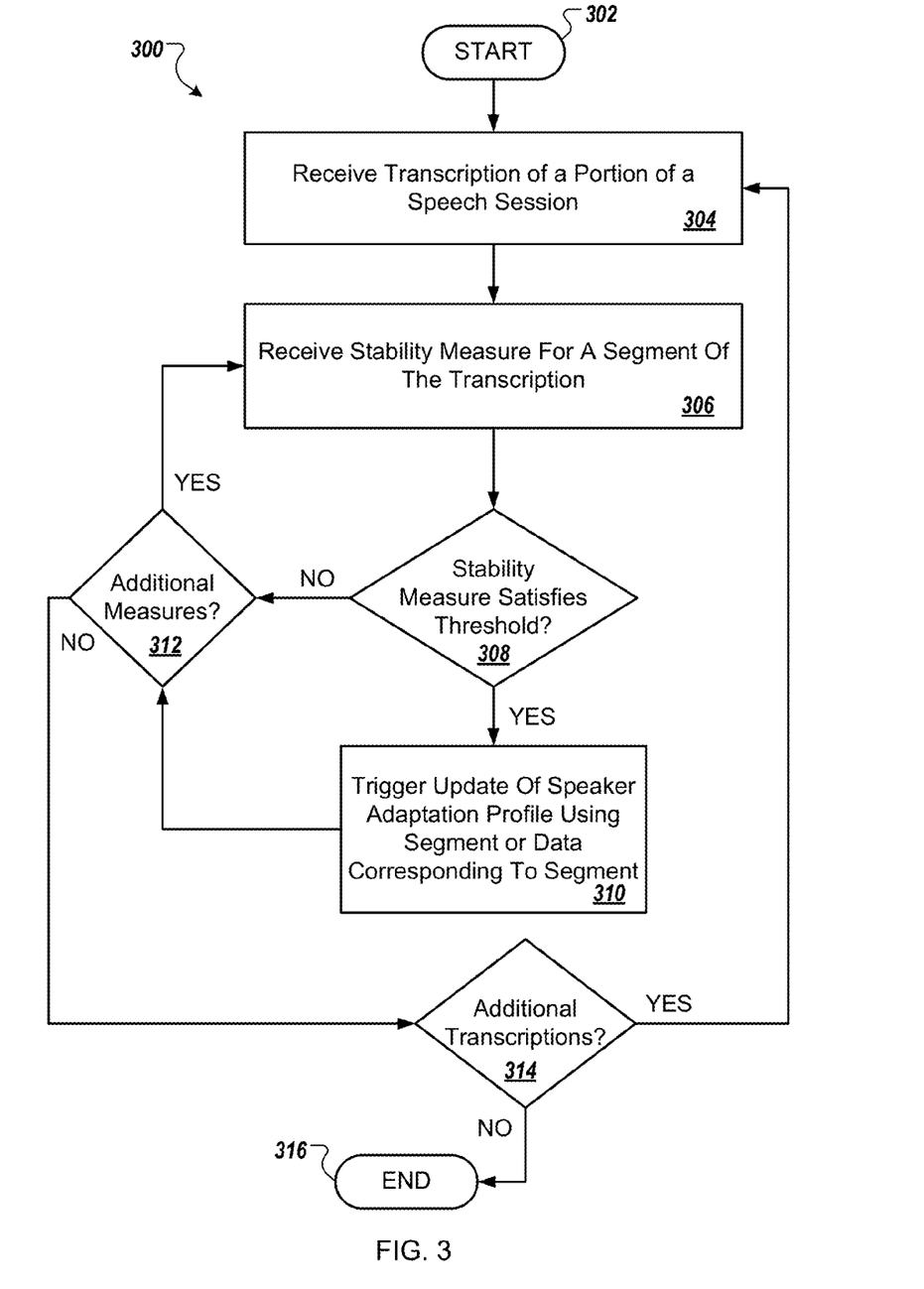
FIG. 3 is a flowchart of an example process for triggering an update of a speaker adaptation profile based on the stability measure of a segment satisfying a threshold.

FIG. 3 is a flowchart showing an example process 300 for triggering an update of a speaker adaptation profile based on the stability measure of a segment satisfying a threshold. In brief, the process 300 includes receiving a transcription of a first portion of an speech session (304), receiving stability measures associated with speech segments from the transcription (306), comparing the stability measures with a threshold to identify stable segments (308), triggering an update of a speaker adaptation profile using the stable segments and/or speech data associated with the stable segments (310); and then repeating the process 300 for transcriptions of other portions of the speech session.

In more detail, the process 300 begins (302) when the segment stability evaluator 226 receives a transcription of a first portion of a speech session (304). The speech session may be, for example, longer than 1 minute in duration, with the first portion being some fraction of that duration (e.g., 30 seconds). In some instances, the speech session may be one utterance, and in other cases it may be multiple utterances. In particular, a speech decoder 224 receives the first portion of the speech session, decodes it to generate the transcription using a speaker adaptation profile 222, and then communicates the transcription to the segment stability evaluator 226.

As explained above, the speech decoder 224 identifies speech segments from the transcription and determines stability measures associated with the speech segments. The speech segments may be a word, sub-word, or group of words identified from the transcription. The segment stability evaluator 226 receives the stability measures associated with segments of the transcription (306). Although FIG. 3 shows this step as being performed after receiving the speech segments (304), it should be appreciated that it may occur before or simultaneously with receiving the speech segments. For example, the speech segments and the associated stability measures may both be received in the same data structures. It should also be noted that, while the process 300 is described as being performed by the segment stability evaluator 226, one or more steps could be performed by the speech decoder 224 or any other appropriate component of the ASR 220. Indeed, in certain implementations the segment stability evaluator may 226 be a component of the speech decoder 224.

The segment stability evaluator 226 then determines whether the stability measures for the speech segments satisfy a threshold (308). In general, the threshold may be any suitable value or set of values (e.g., integers or floating point numbers) that is comparable with the stability measures.

As an example, the stability measures may represent probabilities that the associated speech segment is stable, and determining whether the threshold is satisfied may involve a comparison of each stability measure with the threshold. In other implementations, the stability measures may be time-based stability characteristics such as persistence or right-context. The stability measures may also be based on a normalized and/or weighted combination of, for example, an age metric, a right context metric, and/or a regression.

When the segment stability evaluator 226 determines that a given segment has a stability measure that satisfies the threshold, it triggers an update of the speaker adaptation profile 222 using the segment, or a portion of speech data that corresponds to the segment (310). Triggering the update may be performed synchronously (i.e., as the stable segments are identified) or asynchronously (i.e. queued and processed as resources become available). For example, the segment stability evaluator 226 may push the stable segments and/or speech data corresponding to those segments to an adaptation queue associated with the speaker adaptation profile. When the adaptation profile updater 228 has resources available, it can retrieve the segments and/or speech data from the adaptation queue and update the speaker adaptation profile using the segments and/or speech data. In some versions, the adaptation profile updater 228 updates the speaker adaptation profile by modifying an acoustic model associated with the speaker.

When the segment stability evaluator 226 determines that a given segment is not stable (i.e., does not satisfy the threshold), it determines whether there are additional segments to evaluate (312). If so, then it receives the additional segments and processes them as described above. If not, it determines whether additional transcriptions of portions of the speech session are available (314). When no additional transcriptions are available, the process is complete (316).

But, when additional transcriptions are available, the process 300 repeats; although it should be noted that in some implementations the process 300 can loop back before reaching the end if additional speech sessions exist. In particular, the segment stability evaluator 226 receives a transcription of another portion of the speech session, which may be generated using an updated speaker adaptation profile. For example, in some instances (e.g., long speech sessions for example greater than 1 minute), the segment stability evaluator 226 will determine that a speech segment is stable, and push the segment to the adaptation queue, and the adaptation profile updater 228 will retrieve the segment, process the segment, and load an updated speaker adaptation profile 222, all prior to the speech decoder 224 receiving an additional portion of the speech session and decoding that additional portion to generate a transcription. In such instances, the speech decoder 224 will use the updated speaker adaptation profile for decoding the additional portion of the speech session. For example, if the speech session is longer than 1 minute in duration, the second portion may be some fraction of that duration (e.g., 30 seconds) from the latter part of the speech session.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
   receiving a transcription of a first portion of a speech session, wherein the transcription of the first portion of the speech session is generated using a speaker adaptation profile;
   receiving a stability measure for a segment of the transcription;
   determining that the stability measure for the segment satisfies a threshold;
   in response to determining that the stability measure for the segment satisfies the threshold, triggering a real-time update of the speaker adaptation profile using the segment, or using a portion of speech data that corresponds to the segment;
   receiving a transcription of a second portion of the speech session, wherein the transcription of the second portion of the speech session is generated using the updated speaker adaptation profile; and
   outputting a set of transcriptions comprising the transcription of the first portion of the speech session and the transcription of the second portion of the speech session.

2. The method of claim 1, wherein the segment comprises a word, sub-word, or group of words.

3. The method of claim 1, wherein the speech session is longer than 1 minute in duration.

4. The method of claim 1, wherein the stability measure is based on one or more of an age metric, a right context metric, and a regression.

5. The method of claim 1, wherein triggering an update of the speaker adaptation profile comprises adding the segment to an adaptation queue.

6. The method of claim 1, further comprising:
   receiving the first portion of the speech session; and
   decoding the first portion of the speech session to generate the transcription of the first portion of the speech session using the speaker adaptation profile.

7. The method of claim 1, further comprising determining the stability measure of the segment.

8. The method of claim 1, further comprising:
   receiving the second portion of the speech session; and
   decoding the second portion of the speech session to generate the transcription of the second portion of the speech session using the updated speaker adaptation profile.

9. The method of claim 1, further comprising updating the speaker adaptation profile.

10. The method of claim 9, wherein updating the speaker adaptation profile comprises modifying an acoustic model.

11. The method of claim 1, wherein the stability measure represents a probability.

12. The method of claim 1, wherein the speech session comprises one utterance.

13. A computer-implemented method comprising:
    receiving a first portion of a speech session;
    decoding the first portion of the speech session to generate a transcription of the first portion of the speech session using a speaker adaptation profile;
    identifying a segment of the transcription of the first portion of the speech session;
    determining a stability measure of the segment;
    determining that the stability measure for the segment satisfies a threshold;
    in response to determining that the stability measure for the segment satisfies the threshold, triggering real-time update of the speaker adaptation profile using the segment, or using a portion of speech data that corresponds to the segment;
    receiving a second portion of the speech session;
    decoding the second portion of the speech session to generate a transcription of the second portion of the speech session using the updated speaker adaptation profile; and
    outputting a set of transcriptions comprising the transcription of the first portion of the speech session and the transcription of the second portion of the speech session.

14. A system comprising:
    one or more computers and one or more storage devices storing instructions that are operable, when executed by the one or more computers, to cause the one or more computers to perform operations comprising:
    receiving a transcription of a first portion of a speech session, wherein the transcription of the first portion of the speech session is generated using a speaker adaptation profile;
    receiving a stability measure for a segment of the transcription;
    determining that the stability measure for the segment satisfies a threshold;
    in response to determining that the stability measure for the segment satisfies the threshold, triggering a real-time update of the speaker adaptation profile using the segment, or using a portion of speech data that corresponds to the segment;
    receiving a transcription of a second portion of the speech session, wherein the transcription of the second portion of the speech session is generated using the updated speaker adaptation profile; and outputting a set of transcriptions comprising the transcription of the first portion of the speech session and the transcription of the second portion of the speech session.

15. The system of claim 14, wherein the speech session is longer than 1 minute in duration.

16. The system of claim 14, wherein the stability measure is based on one or more of an age metric, a right context metric, and a regression.

17. The system of claim 14, further comprising updating the speaker adaptation profile.

18. The system of claim 17, wherein updating the speaker adaptation profile comprises modifying an acoustic model.

19. The system of claim 14, wherein the speech session is one utterance.

20. A computer-readable medium storing software comprising instructions executable by one or more computers which, upon such execution, cause the one or more computers to perform operations comprising:

receiving a first portion of a speech session;

decoding the first portion of the speech session to generate a transcription of the first portion of the speech session using a speaker adaptation profile;

identifying a segment of the transcription of the first portion of the speech session;

determining a stability measure of the segment;

determining that the stability measure for the segment satisfies a threshold;

in response to determining that the stability measure for the segment satisfies the threshold, triggering real-time update of the speaker adaptation profile using the segment, or using a portion of speech data that corresponds to the segment;

receiving a second portion of the speech session;

decoding the second portion of the speech session to generate a transcription of the second portion of the speech session using the updated speaker adaptation profile; and outputting a set of transcriptions comprising the transcription of the first portion of the speech session and the transcription of the second portion of the speech session.

* * * * *